(12) United States Patent
Davis et al.

(10) Patent No.: US 6,617,563 B1
(45) Date of Patent: Sep. 9, 2003

(54) PHOTOCELL ARRAY SENSOR FOR PROJECTILE POSITION DETECTION

(76) Inventors: Lawrence Raymond Davis, 516 Beryl Dr., Kent, OH (US) 44240; Thomas Edward Brown, 693 Melrose Rd., Lottsburg, VA (US) 22511

( * ) Notice: Subject to any disclaimer, the term of this patent is extended or adjusted under 35 U.S.C. 154(b) by 0 days.

(21) Appl. No.: 09/933,340

(22) Filed: Aug. 20, 2001

(51) Int. Cl.⁷ .............................................. H01L 27/00
(52) U.S. Cl. ..................................... 250/208.1; 356/38
(58) Field of Search ........................ 356/28; 250/208.1, 250/559.32, 559.29, 221, 559.15, 559.12, 206.1, 206.2

(56) References Cited

U.S. PATENT DOCUMENTS

| | | |
|---|---|---|
| 2,973,964 A | 3/1961 | Zito |
| 3,678,495 A | 7/1972 | Gilbert |
| 3,788,748 A | 1/1974 | Knight et al. |
| 3,807,858 A | 4/1974 | Finch |
| 4,514,621 A | 4/1985 | Knight |
| 4,516,851 A * | 5/1985 | Parker et al. .................. 256/28 |
| 4,870,267 A | 9/1989 | Beeckel |
| 5,095,433 A | 3/1992 | Botarelli et al. |
| 6,194,695 B1 * | 2/2001 | Barrows ................... 250/208.1 |
| 6,414,747 B1 * | 7/2002 | Hardy .......................... 356/28 |
| 6,420,692 B1 * | 7/2002 | Burroughs et al. ...... 250/214.1 |

* cited by examiner

*Primary Examiner*—Stephone B. Allen

(57) ABSTRACT

In accordance with the present invention a projectile sensor comprises a support means, a lens means and a photocell comprised of multiple parallel photosensitive elements interposed by one or more diagonal photosensitive elements on or of a substrate disposed so as to provide changes in their electrical response when objects passing linearly through the sensor's field of view form an image through a lens upon the photosensitive elements in sequence. In its simplest embodiment, the photosensitive elements of the sensor substantially form a forward or reversed English letter "N" shape, such that a projectile's image passing over the photosensitive elements produces a series of electrical responses, where the ratios of the times between such changes relate to the velocity and position of the object.

3 Claims, 7 Drawing Sheets

PHOTOCELL ARRAY SENSOR FOR PROJECTILE POSITION DETECTION

BACKGROUND OF THE INVENTION

1. Field of the Invention

The present invention relates to an apparatus for detecting linear motion of objects, specifically to a photocell device functioning in either a photoconductive, photovoltaic or photoresistive mode with electrical outputs that can be used to generate useful information such as velocity, position, and paths of projectiles or other objects.

2. Prior Art

The location and motion characteristics of projectiles are of great interest, whether taking the form of bullets, artillery rounds, baseballs, golf balls or other objects. When a projectile of interest is small and moving relatively fast, the detection, location and quantification of the motion of the projectile with high degrees of accuracy and reliability are challenging. Numerous devices have been devised to perform one or more such functions, particularly with respect to weapons firing ranges.

Some devices utilizing transducers or similar shock or acoustic wave detectors require the projectile of interest to impact a target so that the impact point can be determined. The signals from such detectors are fed into a calculating device that calculates the position of the bullet or other projectile, causing the position to be displayed or stored. Systems of this general type are disclosed in U.S. Pat. No. 2,973,964 (Zito), U.S. Pat. No. 3,678,495 (Gilbert), U.S. Pat. No. 5,095,433 (Botarelli et al.), and U.S. Pat. No. 4,514,621 (Knight).

Other devices use direct or indirect lighting in beam arrangements that permit triangulation based on reflections or direct impingement of light relative to reference lines as in U.S. Pat. No. 3,807,858 (Finch). Some apparatus merely detect the passing of an object through an area, as in the case of U.S. Pat. No. 4,870,267 (Beeckel) and U.S. Pat. No. 3,788,748 (Knight et al.).

More complex apparatus employ active means such as radar or scanning laser devices to determine time-of-arrival and angle-of-arrival information using reflected radio or light energy responses to detect and track projectiles. Radar is very expensive, can produce potentially harmful emanations, and is quite bulky. Whether simple or complex, the projectile sensing devices heretofore known suffer from a variety of disadvantages:

(a) The prior art apparatus generally only provide position or velocity, not both. None provide adequate information for calculation of a projectile's flight path so that its point of origin or destination, or its location in space can be calculated for any given time along the object's path. Different specific devices are required to capture different parameters. While some may provide a position of a projectile by virtue of its impact on a target or surface, locating the object in free space requires a different apparatus, which does not provide velocity information. Other devices may provide velocity, but not position or location.

(b) Most prior art is limited in the dynamic range of certain parameters, such as velocities within relatively narrow ranges. For example, a device may only be capable of capturing velocities of supersonic or hypersonic projectiles, but not subsonic.

(c) Many prior solutions require prior knowledge of an object's precise path of travel.

(d) The utility and accuracy of some of the prior art systems diminish as the target material degrades, and sometimes a detector component is damaged or degraded by projectile perforations.

(e) Their functionality requires complex pre-arrangement of system components. In some cases, reflective panels are required to be positioned opposite multiple sensors, whereby ambient conditions are controlled, or reference lines are in view of the sensing device. More complex systems, such as those employing radar, require complex calibration methods to ensure accuracy.

(f) Some prior art projectile detectors require the use of delicate and damage-prone microphones or transducers that require frequent repair or replacement.

BRIEF SUMMARY OF THE INVENTION

In accordance with the present invention a projectile sensor comprises a specially shaped or exposed photocell and a lens means mounted within a support means. The passing of a projectile within the field of view of the sensor causes several momentary changes in the amount of photonic energy impinging on the sensitive areas of the photocell which in turn causes measurable electrical responses from the photocell. The times of the electrical responses and the ratios of the time periods between the electrical responses relate to the velocity and position of the projectile.

Objects and Advantages

Accordingly, the objects and advantages of the present invention are:

(a) to provide a projectile sensor that combines many capabilities and characteristics into a single device or several identical devices with intersecting fields of view, including the ability to allow both velocity and position in space to be determined accurately;

(b) to provide a projectile sensor that permits the derivation of accurate position data across wide ranges of projectile sizes and velocities and at high repetition rates;

(c) to provide a projectile sensor that can support measurements of projectiles randomly originating from a range of angles in both the horizontal and vertical planes, while providing the means to predict the origin, destination, and path of any of the projectiles;

(d) to provide a projectile sensor that can support the accurate determination of a projectile's position, angle-of-arrival, and velocity as it passes through an imaginary plane in lieu of a physical target or surface, thereby avoiding degradation due to projectile impacts or perforations;

(e) to provide a projectile sensor with relatively simple and flexible emplacement options, alignment, and calibration, capable of operating across a wide range of ambient conditions;

(f) to provide a projectile sensor that is durable and reliable;

Additional objects and advantages are to provide a projectile sensor that does not require an external power source, employs simple and rugged construction approaches, and which can be constructed, operated and maintained at low cost. There is a need for improved projectile sensor devices that combine all of the above positive characteristics, while providing the previously unappreciated characteristic of providing angle-of-arrival within a single detector apparatus. Still further objects and advantages will become apparent from contemplation of the following descriptions and drawings.

DRAWING FIGURES

Figure 1:
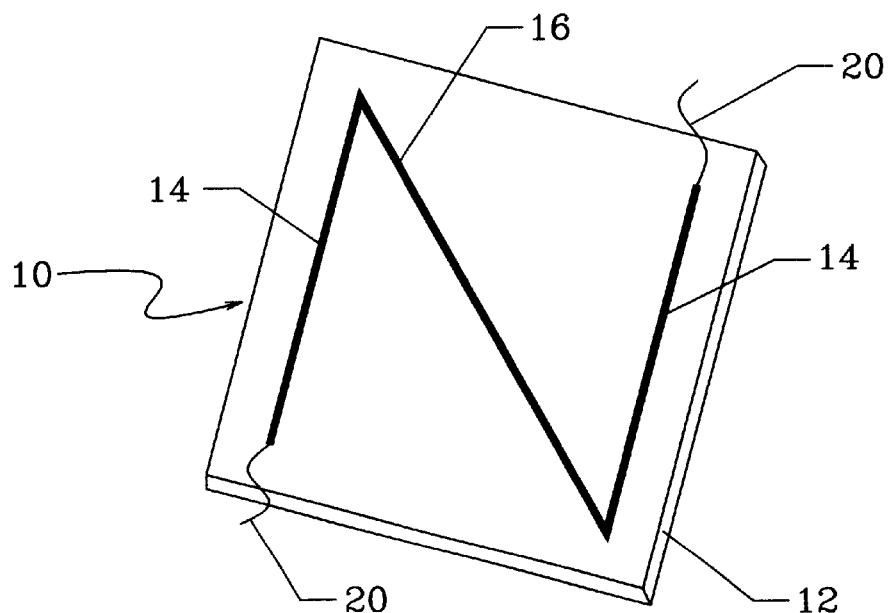
FIG. 1 shows the projectile sensor photocell with three photosensitive elements in the form of the English letter "N" with two parallel elements and one diagonal element, formed of continuous photosensitive material, with an electrical lead extending from each end.

REFERENCE NUMERALS IN DRAWINGS 10 photocell with uniquely-shaped photosensitive active area
11 conventional large area photocell
12 photocell base material
14 parallel photosensitive element
16 diagonal photosensitive element
18 photonic energy-blocking mask with specially shaped open areas
20 non-photosensitive electrical leads or connections
30 support means
60 lens means

Description—FIGS. 1 to 11

FIGS. 1 to 7 show several embodiments of the photocell 10 of the present invention, including the preferred embodiment (FIG. 1) of the projectile sensor's specially shaped photocell 10. Most embodiments of the photocell 10 have a combination of at least three (FIGS. 1, 2) or four (FIGS. 3–5) photosensitive elements 14, 16. One embodiment (FIG. 7) has five photosensitive elements 14, 16 and is similar to the photocell 10 shown in FIG. 4 with the fifth element parallel to the end elements 14 and disposed between the diagonal elements 16 in the center of the photocell 10. This embodiment allows a convenient measurement of the time of passage of a projectile across the center plane of the field of view of the present invention. A further embodiment is shown in an exploded view (FIG. 6) where a common large area photocell is used in combination with a mask to block the majority of impinging photonic energy except where clear areas or open slits have been made in the desired shape and size. This embodiment accomplishes the same functions of the specially shaped photocells mentioned herein.

Figure 2:
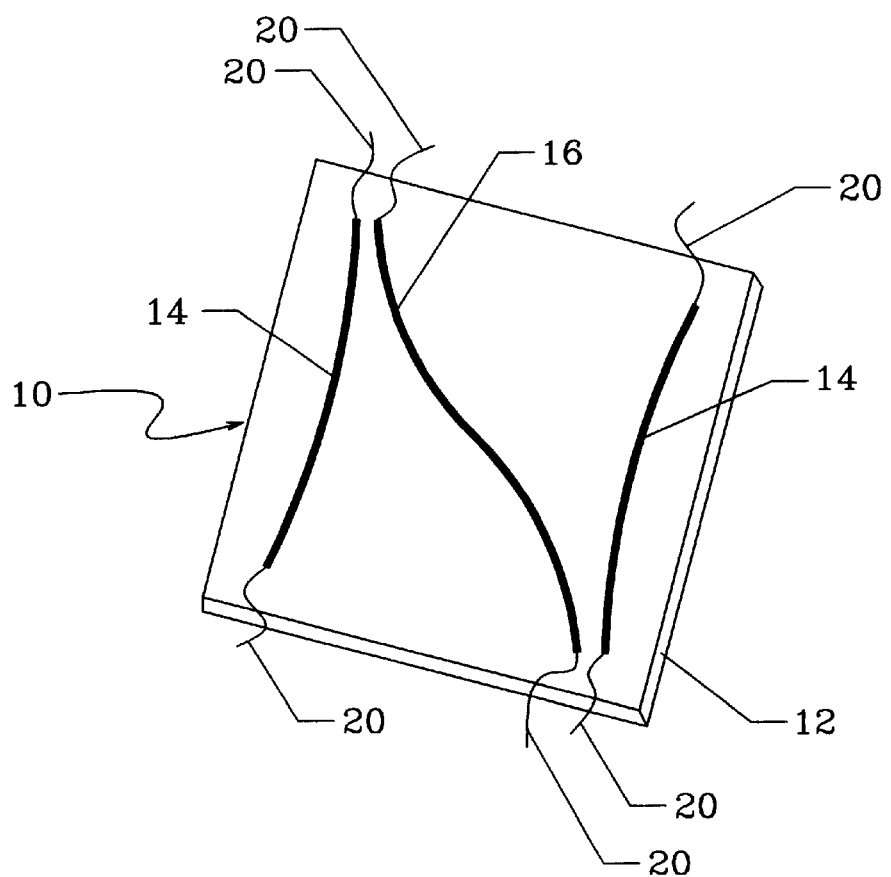
FIG. 2 shows the projectile sensor photocell, approximately in the form of the English letter "N", with three non-continuous curved elements—the curved elements showing how lens distortions may be counteracted—with electrical leads extending from the ends of individual photosensitive elements.

The photosensitive elements 14, 16 of a photocell 10 may be curved to counteract known forms of image distortion by a lens 60, so the timing of the electrical responses produced by the photosensitive elements 14, 16 of the photocell 10 from the passage of a projectile through the field of view of the projectile sensor will be more linear (example of one pattern shown in FIG. 2). If the elements are not curved lens distortions can be removed mathematically.

The photosensitive elements 14, 16 are mounted on, made from or made a part of the photocell base material 12. Base material 12 is typically silicon, but may be glass or other substrate. Optically clear glass substrates will allow the use of rear-mounted imagers or cameras to take pictures of projectiles through the lens means of the projectile sensor.

Any end of a photosensitive element 14, 16 that is not directly attached to another of its kind will have a non-photosensitive electrical lead or connection 20 attached to it (FIGS. 1–5, 8).

Figure 3:
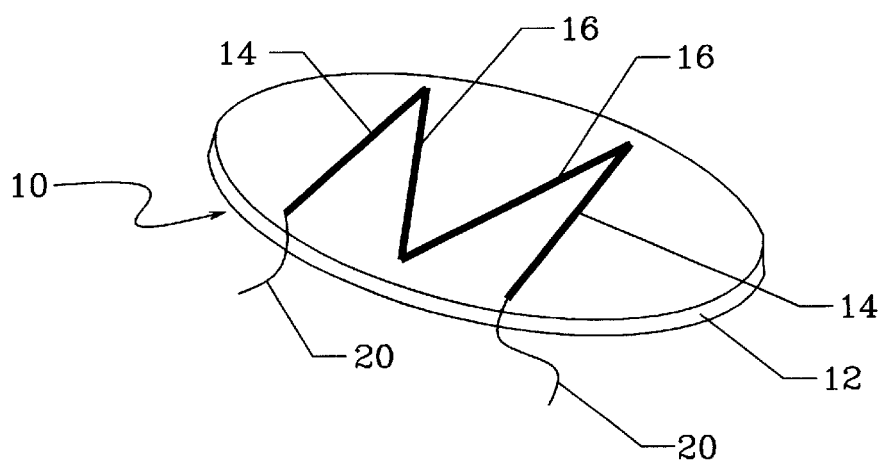
FIG. 3 shows the projectile sensor photocell with four photosensitive elements arranged in approximately the form of the English letter "M", two of which are non-parallel diagonal elements, formed of continuous photosensitive material with an electrical lead extending from each end, on a circular-shaped base material.

The photosensitive elements 14, 16 may be of a "folded" form as in FIGS. 1 and 3, where the photosensitive elements 14, 16 are of continuous photosensitive material. A non-photosensitive electrical lead 20 is found at the distal ends of the parallel photosensitive elements 14 in a photocell 10 of the folded form (FIGS. 1, 3, 8).

Photosensitive elements 14, 16 which are not of a folded form (FIGS. 2, 4 and 5) are considered "separate" and may be connected in series or parallel by non-photosensitive connections 20.

Figure 8:
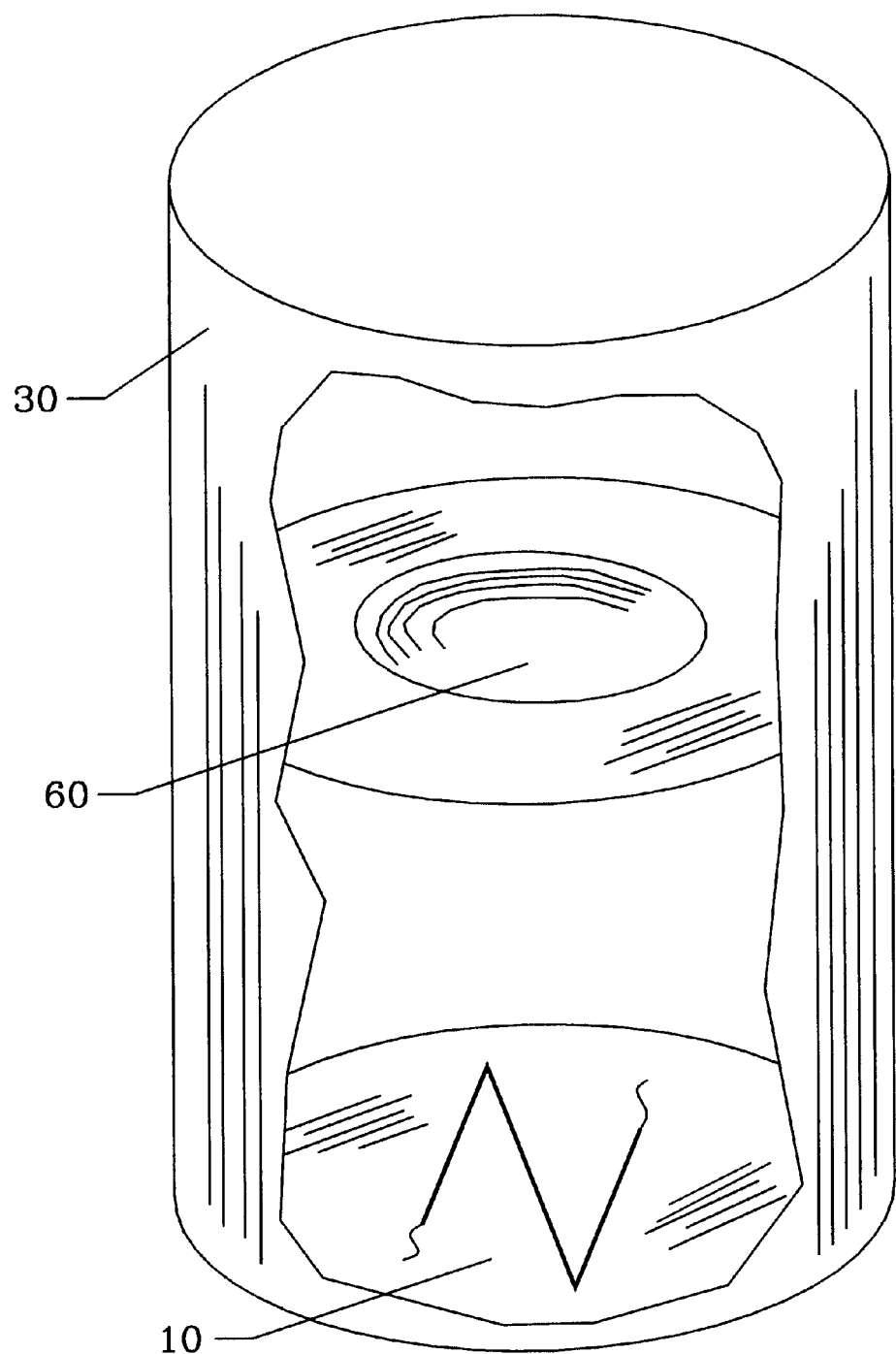
FIG. 8 shows the projectile sensor components of a specially shaped photocell and a lens means within a support means.

A preferred embodiment of the present invention is shown in FIG. 8 with a folded specially shaped photocell 10 in the form of the English letter "N", centered on, and disposed in, the focal plane of a lens means 60, both of which are mounted securely in a support means 30.

Figure 9:
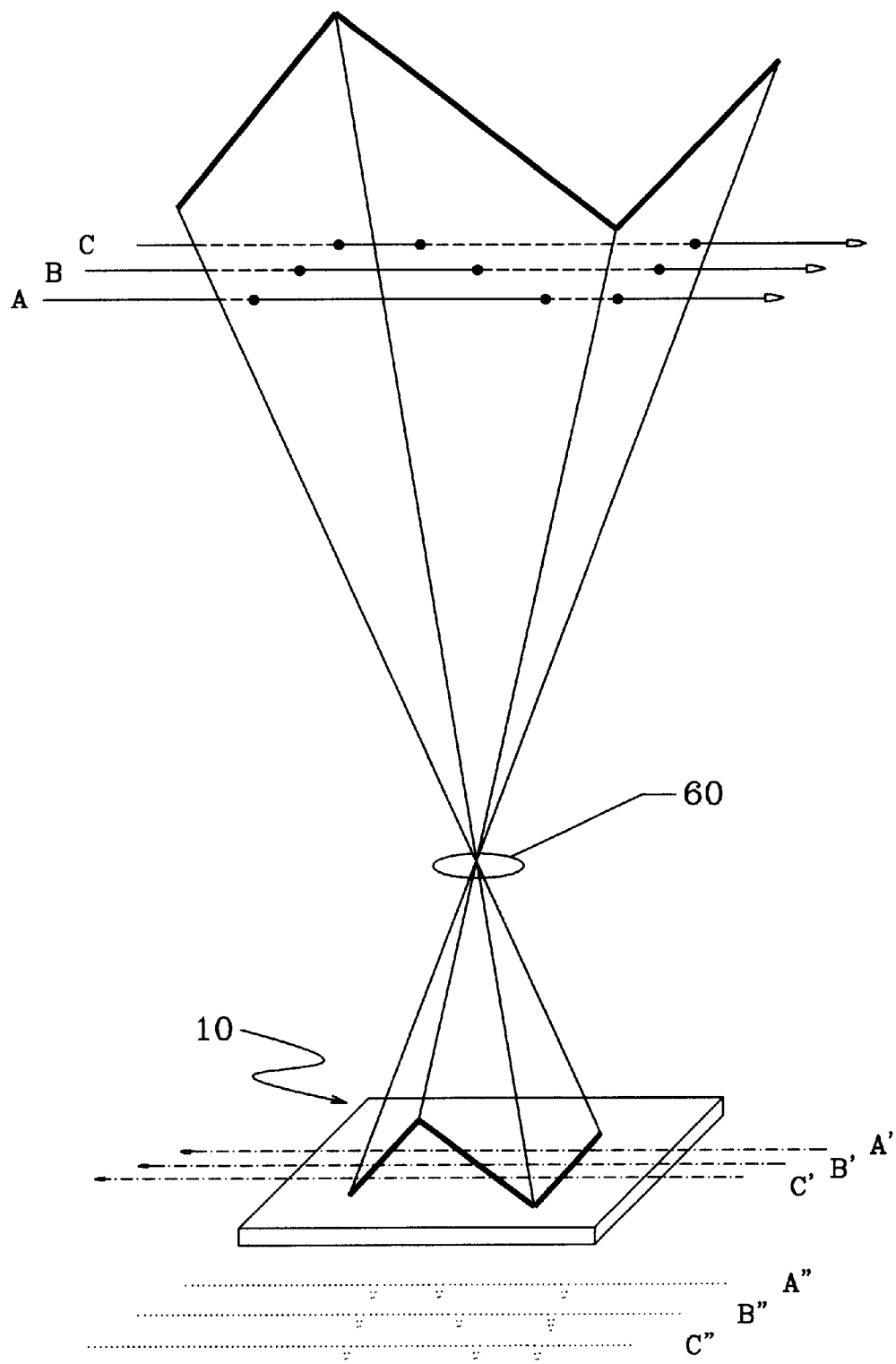
FIG. 9 shows the projectile sensor photocell and a lens means with an optical expression of the sensor's active area and simulated projectile paths (A–C), projectile image paths (A'–C') and resulting electrical responses (A"–C") from the photosensitive material.

A specially shaped photocell 10 in the form of the English letter "N" and disposed in the focal plane of a lens means 60 is shown in FIG. 9. Also included in FIG. 9 is the optical expression of the photocell's sensitive areas projected through the lens means 60 within the sensor's field of view. Three simulated projectile paths (A, B, C) passing through the field of view of the lens means 60 and the images of the projectile paths (A', B', C') on the surface of the photocell 10 are shown. A representation of the electrical response of the photocell's sensitive area to the passage of the images of the projectile paths is shown by dotted lines (A", B", C").

There are various possibilities with respect to the special shape of the photocell's 10 active area using three, four or five straight or somewhat curved elements 14, 16 of photosensitive material, as shown in FIGS. 1 to 5 and 7 or mentioned in the foregoing description.

Figure 10:
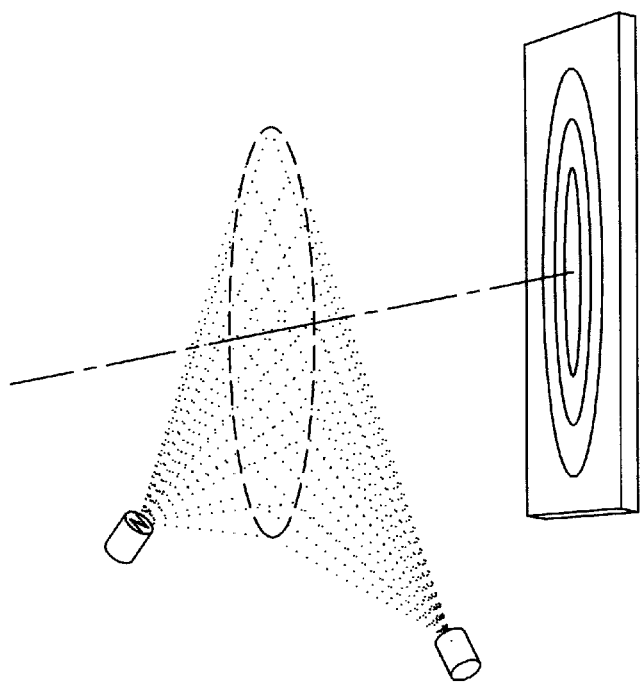
FIG. 10 shows a two-sensor arrangement with intersecting fields of view in front of a target with a line passing through the center of the intersecting fields of view to the center of the target.

A multi-sensor arrangement of two projectile sensors of the present invention with intersecting fields of view is shown in FIG. 10. The sensors are substantially orthogonal to one another and are disposed in front of a target such that a projectile impacting the target normally will first pass normally through the area of the sensors' intersecting fields of view. The photocells 10 of the sensors of FIG. 10 may be of the three-, four- or five-element type.

Figure 11:
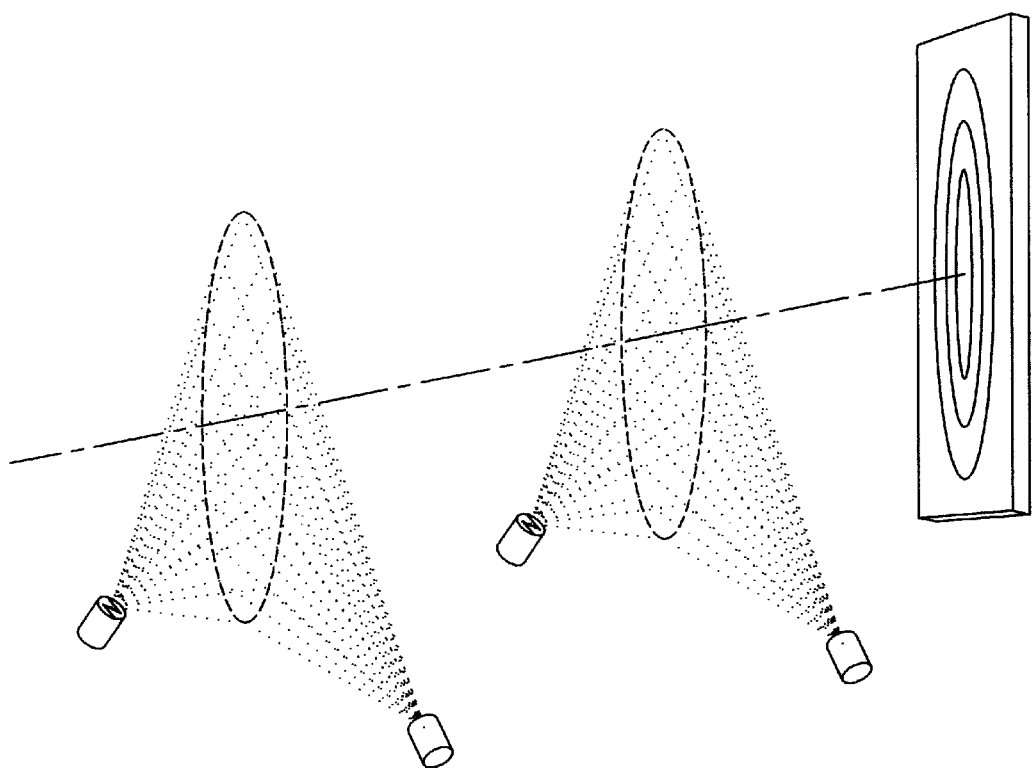
FIG. 11 shows a four-sensor arrangement with intersecting fields of view in front of a target with a line passing through the centers of the intersecting fields of view to the center of the target.

A multi-sensor arrangement of four projectile sensors of the present invention is shown in FIG. 11 as two complementary pairs. The two sensors of a pair are substantially orthogonal to one another and have intersecting fields of view. The two pairs are disposed in tandem in front of a target such that a projectile impacting the target normally will first pass sequentially and normally through the area of each pair's of sensors' intersecting fields of view. The photocells 10 of the sensors of FIG. 11 are of the three-element type shown in FIGS. 1 and 2.

Operation—FIGS. 1 to 11

The method of operation of the projectile sensor is simple yet notably different from any of the cited prior art. FIG. 1 shows the simplest form of the projectile sensor's specially shaped photocell, while the preferred embodiment of the projectile sensor is shown in FIG. 8. Variations in geometric relationships and complexity are shown in FIG. 2 through FIG. 5 and in FIG. 7. The operating principles and options will be described with respect to the preferred embodiment first, with differences in the more complex photocell shapes and operations following.

The photocell of the present invention in its preferred embodiment is a photodiode operating in the photovoltaic mode. The photocells of other embodiments may be photodiodes operating in the photoconductor mode. The photocells may also be other photosensitive devices such as phototransistors or photoresistors with similarly shaped or masked photonic energy-sensitive areas.

Figure 6:
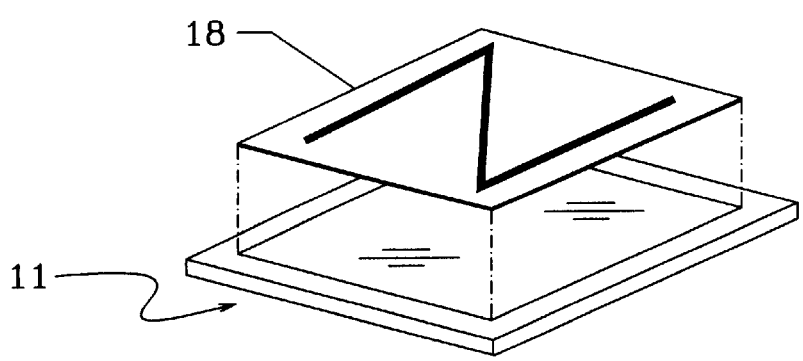
FIG. 6 is an exploded view of large area photocell (typically a photodiode) with a photonic energy-blocking mask with clear areas or open slits where photonic energy is desired to pass.

FIG. 6 shows an exploded view of a common large area photocell with a mask to block the majority of impinging photonic energy except where clear areas or open slits have been made in the desired shape and size. This embodiment functions similarly to the specially shaped photocells mentioned herein.

FIG. 9 shows the N-shaped photocell, its disposition relative to the lens and the optical expression of the photocell within the field of view of the lens. When the sensor is correctly positioned, a projectile will pass through the field of view of the sensor, normal to the optical axis, and the projectile's image will cross the photosensitive elements, normal to the parallel elements of the N-shaped photocell. The passing of the projectile's image across the photosensitive elements will cause the voltage output of the photocell to change momentarily each time the image crosses an element. These changes, or electrical responses, are well defined and their times of occurrence can be readily measured. Based on the ratios of the periods defined by the timing of the electrical responses, the projectile's angular offset from the optical axis of the sensor can be mathematically determined.

Examples of changes in the timing of the electrical responses (A", B", C") of the N-shaped photocell are shown at the bottom of FIG. 9, where three projectiles (A, B, C) have passed through the field of view of the lens at different locations.

When two such projectile sensors are arranged orthogonally with intersecting fields of view and placed at known points near a target (FIG. 10) so a projectile fired at the target will pass through the fields of view normal to the sensors' optical axes, each sensor will independently register the passage of the projectile by producing the electrical responses noted above. When the projectile's angular offset from the optical axis of each sensor is mathematically determined, a further mathematical process may be used to determine the point of intersection of the two angles and hence, the position of the projectile as it crossed the plane occupied by the optical axes of the sensors. When the position of the projectile is known, the distance from each sensor also is known, allowing two separate calculations of the velocity of the projectile to be made.

Further, when two sets of two such projectile sensors are arranged as described above and near a target with each set spaced some distance apart from the other so that the projectile passes through the fields of view of all four sensors (FIG. 11), two time-separated positions of the projectile will result, substantially defining a segment of the line of flight of the projectile. This knowledge of the line of flight of the projectile, along with the four separate calculations of the velocity of the projectile, will permit the highly accurate estimation of the projectile's position at any reasonable time or distance prior to or after passing the projectile sensors.

Figure 7:
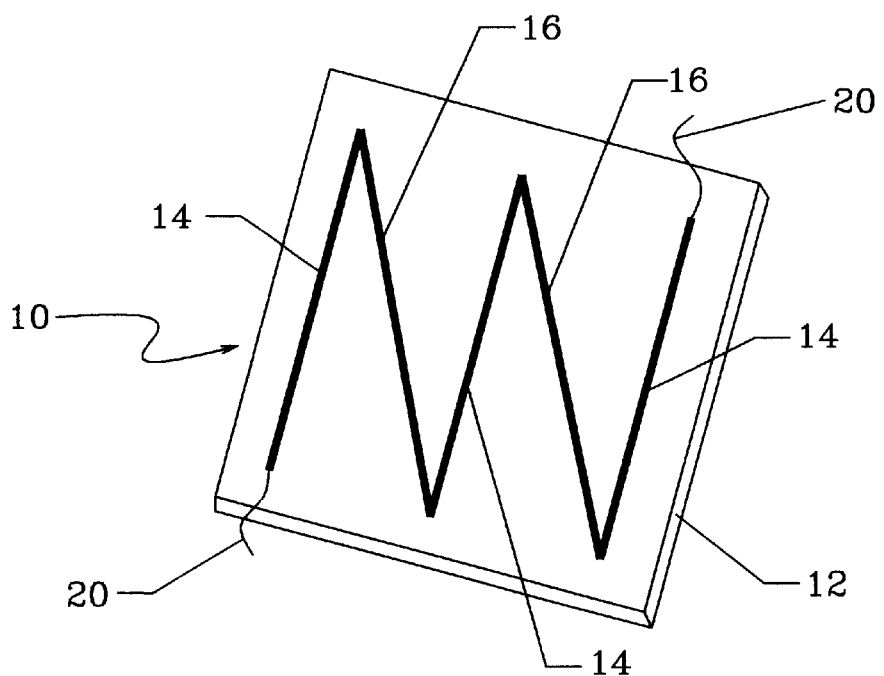
FIG. 7 shows the projectile sensor photocell with five photosensitive elements in the form of two English letters "N" with two adjacent parallel elements superimposed and two diagonal elements, one each disposed between two adjacent parallel elements, formed of continuous photosensitive material, with an electrical lead extending from each end.

Adding photosensitive elements to the three-element photocell (FIG. 1) has the effect of consolidating two three-element photocells under one lens. The principal advantage being the ability to derive accurate projectile position, path and velocity information with fewer total sensors. For example, FIG. 7 shows the photocell for a sensor that would be, in effect, one-half of the multiple sensor array of FIG. 11 and would allow the use of an array similar to that seen in FIG. 10 while retaining the advantages of the array seen in FIG. 11. The N-shaped photocells (FIG. 1) of two sensors on one side of the target, seem to be moved so close together that the adjacent parallel elements of the photocells appear superimposed (FIG. 7). In fact, the photocell (FIG. 7) is of the folded form and incorporates five photosensitive elements. While the center (fifth) element is not required to derive projectile position, path and velocity information, it is a convenient and useful aspect of the invention because the photocell's center element will signal a projectile's passage approximately halfway through the sensor's field of view and may also be used as a reliable camera trigger.

Figure 4:
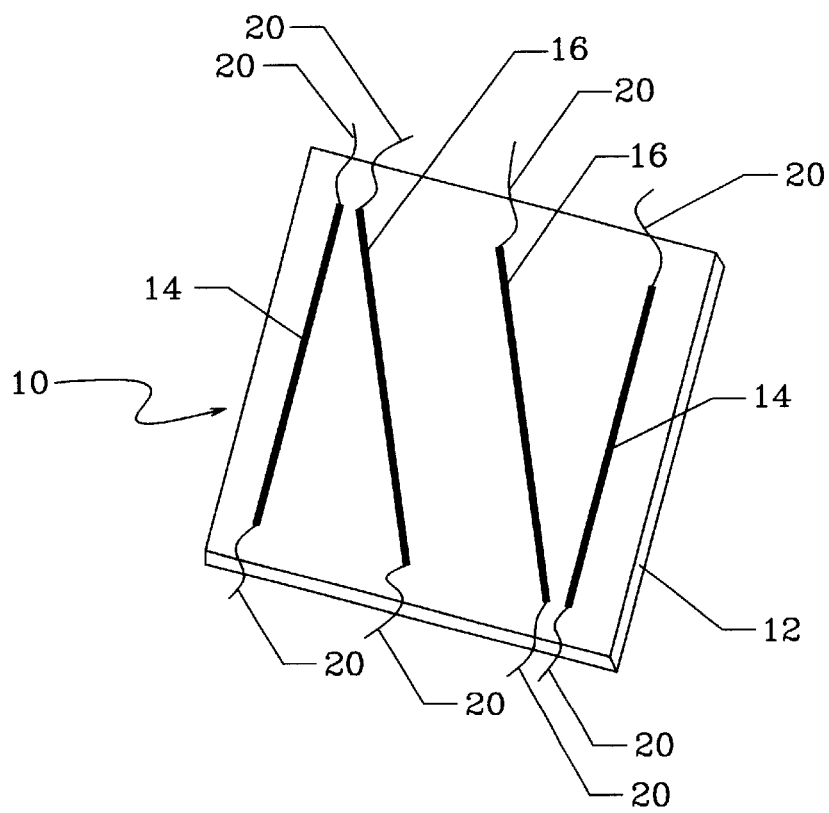
FIG. 4 shows the projectile sensor photocell with four elements, a pair each of separated parallel and diagonal photosensitive elements, each element having its own electrical leads.
Figure 5:
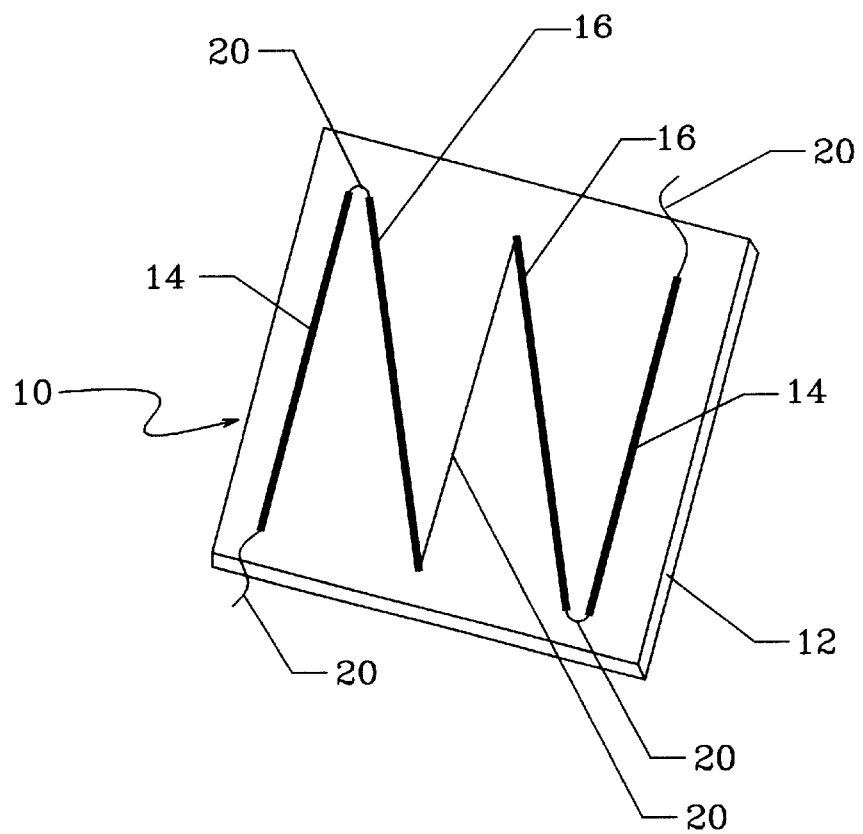
FIG. 5 shows the projectile sensor photocell with four separate photosensitive elements, two parallel end elements and two diagonal elements which are parallel to one another, connected in series with non-photosensitive connections and having an electrical lead extending from the ends.

The four-element photocell shown in FIG. 4 similarly incorporates more elements than a three-element photocell (FIG. 1) to provide an additional electrical response. The result is a more complex photocell providing information not available from a single three-element photocell, particularly angle of passage of the projectile with respect to the photosensitive elements. The same improvement of the five-element photocell (FIG. 7) over the three-element photocell (FIG. 1) of providing sufficient electrical responses to derive projectile position, path and velocity information from two, vice four of the three-element photocell sensors is present in the four-element photocell (FIG. 4).

A projectile sensor containing a photocell with four photosensitive elements (FIGS. 3, 4, 5) functions as described above for the three-element photocell but provides four electrical responses with the passage of a projectile through the field of view of the sensor. The ratios of the time periods defined by the four electrical responses permit the calculation of similar mathematical information with respect to projectile position where it crossed through the plane containing the optical axis of the lens, however, mathematical computations based on the more numerous time ratios also permit the determination of a projectile's angle of passage in a plane parallel to the surface of the photocell. When the projectile sensors are employed in pairs as above, this important aspect of the invention results in dramatic improvements in the accuracy of position and velocity calculations of projectiles arriving at many different angles.

Conclusion, Ramifications and Scope

Accordingly, the reader will see that the projectile sensor of this invention can be used as a single sensor to develop information about a passing projectile or an object behaving as a projectile such as a ball rolling on a flat surface, a vehicle traveling in a lane of traffic or an aircraft flying a stable course and altitude. As additional similar sensors are added, more and more useful information about projectiles and similar objects can be calculated based on the electrical responses as a result of the images of the objects that cross the elements of photosensitive material of the photocells. On a firing range, for example, several or many sets of two projectile sensors with intersecting fields of view can be used to help determine a projectile's trajectory, positions at given points in its flight, velocity, deceleration properties and point of strike on a target. Similar information for numerous projectiles may be used for weapons testing or ammunition quality assurance purposes.

It can also be seen that by increasing the number of photosensitive elements of a photocell from three to four, it is possible to reduce the number of sensors (from four to two) in an array and still develop information about a projectile's line of flight—including when and where it will strike an object and from where the projectile came. The five-element photocell, which has a photosensitive element collocated with the optical axis of the sensor, adds the advantage of having an electrical response as a projectile crosses the plane of the optical axis which can be used as a camera trigger or as a measure of the time at which a projectile crossed the center line of the sensor.

Although the description above contains many specificities, these should not be construed as limiting the scope of the invention but as merely providing illustrations of some of the presently preferred embodiments of this invention. For example, instead of being stationary, the sensors of the present invention may be affixed to moving objects such as vehicles and used for steering or tracking based on the specially shaped photocell's electrical responses to lights or reflected light from lines or other objects along a road or other track. The sensors can be arranged and used to assist with a variety of applications including speed control, steering control, process control, positioning control, position determination and adjustment, object orientation and inspection.

It should be further noted that while specific photosensitive elements of the photocell of the present invention have been labeled parallel elements' and which are parallel in the preferred embodiment, those elements or any of the elements do not necessarily have to be parallel to one another, providing their disposition with respect to all elements of the photocell is known so mathematical calculations may be adjusted accordingly.

The scope of the invention should be determined by the appended claims and their legal equivalents, rather than by the examples given.

We claim:

1. A projectile sensor comprising:
    (a) a photocell detector having a substantially planar surface with a photosensitive active area substantially in the form of a plurality of parallel elements and at least one diagonal element interposed between two adjacent said parallel elements, said parallel and diagonal elements being substantially long and narrow
    (b) a lens means of forming a substantially focused image on said photocell detector, said image substantially covering said photosensitive active area and representing the field of view of said lens means
    (c) a support means for holding said lens means and said photocell detector, such that said photosensitive active area is substantially normal to and centered on the optical axis of said lens means
    whereby said sensor is oriented such that a projectile transiting said field of view of said lens means appears in said image and transits said active area substantially normal to said parallel elements and falls once upon each of all said elements producing a plurality of brief electrical responses equal to the number of all said elements, such that the times of said responses when captured by a threshold detection means, define time periods between responses, the duration and ratios of said time periods relating to said projectile's velocity, position, and path through space.

2. The projectile sensor as in 1 combined in multiples with said optical axis of all said sensors lying substantially in the same plane and intersecting substantially at a point
    whereby said time periods obtained from at least two of said sensors are sufficient to determine the time and location of intersection of said projectile's path with said plane and the velocity of said projectile at said time.

3. The combined sensors as in 2 combined in multiples to form multiple said planes, substantially in parallel
    whereby said time and location of intersection of said projectile's path with at least two of said planes determines a segment of said projectile's trajectory and the velocity of said projectile through said segment.

* * * * *